United States Patent [19]

Sherk et al.

[11] 4,376,196

[45] Mar. 8, 1983

[54] ARYLENE SULFIDE POLYMER PURIFICATION

[75] Inventors: Fred T. Sherk; James T. Edmonds, Jr., both of Bartlesville, Okla.

[73] Assignee: Phillips Petroleum Company, Bartlesville, Okla.

[21] Appl. No.: 194,305

[22] Filed: Oct. 6, 1980

[51] Int. Cl.³ .............................................. C08F 6/24
[52] U.S. Cl. ................................... 528/481; 528/483; 528/488; 528/489
[58] Field of Search ............... 528/488, 481, 483, 490, 528/489; 260/29.2 R

[56] References Cited

U.S. PATENT DOCUMENTS

| | | | |
|---|---|---|---|
| 3,707,528 | 12/1972 | Miles | 260/79 |
| 3,717,620 | 2/1973 | Rohlfing | 260/79 |
| 3,839,302 | 10/1974 | Miles | 260/79 |
| 4,071,509 | 1/1978 | Edmonds, Jr. | 260/79 |

Primary Examiner—Lorenzo B. Hayes
Assistant Examiner—Amelia B. Yarbrough

[57] ABSTRACT

Arylene sulfide polymers containing ash-forming impurities or materials are purified by contacting an aqueous mixture of such polymer with molecular oxygen under conditions sufficient to reduce the ash-forming impurities and concurrently at least partially cure the polymer.

6 Claims, No Drawings

ARYLENE SULFIDE POLYMER PURIFICATION

This invention relates to the purification of arylene sulfide polymers containing ash-forming impurities. In accordance with another aspect, this invention relates to a process for the reduction of ash-forming impurities contained in arylene sulfide polymers and concurrently at least partially curing the polymer during deashing of the polymer. In accordance with a further aspect, this invention relates to a process for the reduction of ash-forming impurities present in arylene sulfide polymers by heating a slurry of the polymer in water in the presence of an oxygen-containing gas to simultaneously deash and at least partially cure the polymer to higher molecular weight polymers. In yet another aspect of the invention, it relates to the improvement of color and other properties of arylene sulfide polymers by specific treatment of aqueous slurries of the polymer during production of the polymer.

In applications such as in the production of fibers and films from arylene sulfide polymers, it is desirable that the amount of ash-forming impurities in the arylene sulfide polymer be as low as possible and, in many instances, below about 1 wt. % in order to meet product (customer) specification. Various procedures have been utilized to purify arylene sulfide polymers containing ash-forming impurities or materials. In addition, arylene sulfide polymers ranging in consistency from viscous liquids to crystalline solids are known. While such polymers exhibit desirable properties for many applications such as molding compositions, the unmodified polymers normally possess a relatively high melt flow, e.g., above 4,000 which inhibits their use. It has now been discovered that arylene sulfide polymers can be treated in a manner such that the polymers are essentially freed of ash-forming materials and concurrently cured to a higher molecular weight product exhibiting reduced melt flow.

Accordingly, an object of this invention is to provide a process for improving the color and other properties of arylene sulfide polymers.

A further object of this invention is to provide an improved process for the reduction of ash-forming impurities contained in arylene sulfide polymers and, at the same time, at least partially cure the polymer.

A further object of this invention is to provide arylene sulfide polymers having increased utility by reducing the ash-forming impurities present in the polymers and producing a polymer of reduced melt flow.

Other objects, aspects, and the several advantages of the invention will be apparent to those skilled in the art upon a study of the specification and the appended claims.

Broadly, according to the invention, the amount of ash-forming impurities contained in arylene sulfide polymers is reduced by heating the polymer slurried in an aqueous medium in the presence of an oxygen-containing gas under conditions of temperature and time sufficient to reduce the amount of ash-forming impurities and simultaneously effect at least partial cure of the polymer and reduce the melt flow thereof.

Accordingly, arylene sulfide polymers, such as polyphenylene sulfide, are essentially freed of alkali metal halide and ash forming impurities to meet product specifications and concurrently cured to higher molecular weight polymers by contacting raw polymer, water, and molecular oxygen at an elevated temperature and pressure for a period of time sufficient to appreciably reduce the amount of ash-forming impurities and effect at least partial cure of the polymer and substantially reduce the melt flow thereof in relationship to the starting polymer material.

Arylene sulfide polymers which can be employed in the process of this invention include arylene sulfide polymers generally which contain ash-forming impurities as specified above and which have a melt flow prior to curing of at least about 1,000 and generally within the range of about 3,000 to about 15,000, and higher (determined by the method of ASTM D 1238-70, modified to a temperature of 316° C. using a 5-kg weight, the value being expressed as g/10 min.). Thus, the arylene sulfide polymers can be linear, branched, or lightly crosslinked. Although the method by which the polymers of this description are produced is not critical, preferably the polymer employed in the process is prepared by use of polyhalo aromatic compounds, alkali metal sulfides, and organic amides. For example, the arylene sulfide polymer for use in this invention can be produced by the method of U.S. Pat. No. 3,354,129. Alternatively, the polymer employed is prepared by use of a p-dihalobenzene, an alkali metal sulfide, an organic amide, and an alkali metal carboxylate, as in U.S. Pat. No. 3,919,177, optionally together with an alkali metal hydroxide such as sodium hydroxide, e.g., in an amount up to about 0.8 mole of alkali metal hydroxide per mole of alkali metal sulfide and/or a polyhalo aromatic compound such as 1,2,4-trichlorobenzene, e.g., in an amount up to about 0.6 part by weight per 100 parts by weight p-dihalobenzene. If desired, a lithium halide such as lithium chloride can be used instead of the alkali metal carboxylate to produce the polymer. If desired, water which can be present with the reactants can be removed by distillation prior to the polymerization reaction.

It is to be understood that the process of this invention can be carried out in a number of ways. In one mode of operation, the reaction mass comprising particulate polymer, alkali metal halide, and organic amide can be subjected to suitable separation techniques to recover polymer freed, as much as possible, of organic amide, unreacted reactants, and alkali metal halide. For example, the polymer can be recovered from the reaction slurry and then combined with water to extract ash-forming materials. The amount of impurities (ash) remaining from this operation prior to treatment, according to the invention, can range from about 0.5 to about 1 wt. %, and higher.

In accordance with the invention, phenylene sulfide polymer containing ash-forming materials is contacted in an aqueous slurry with an oxygen-containing gas at an elevated temperature and pressure for a period of time sufficient to substantially reduce the amount of ash-forming materials in the polymer and, at the same time, at least partially cure the polymer product and reduce the melt flow thereof.

The heating to effect deashing and concurrent curing can be carried out at an elevated temperature which is below the melting point of the polymer for a period of time sufficient to effect deashing and at least partial curing. Normally, the contacting will be at least about 300° F. and will not exceed about 25° F. below the melting point of the polymer. Ordinarily, the contacting temperatures will be in the range of about 350° F. to about 520° F.

The time for treatment or contacting can vary greatly depending, in part, on the temperature and the nature of the arylene sulfide polymer. It generally will be within the range of about 5 minutes to about 24 hours, preferably about 30 minutes to about 10 hours. For example, with a given slurry and to effect a given reduction in melt flow, the contact time decreases with increasing temperature. The pressure should be sufficient to maintain liquid phase conditions which can range from about 0 to about 1,500 psia. Repeated treatments can be employed, if desired, and the process can be carried out in several stages, if desired.

As indicated above, the heating is carried out in the presence of an oxygen-containing gaseous oxidizing atmosphere such as air, pure oxygen, and the like. The oxidizing gas rate, with respect to contacting of the particulate polymer in the slurry, will vary appreciably depending upon the type of apparatus employed for carrying out the oxidative curing and deashing. If desired, the oxygen-containing gas can be heated prior to contacting with the polymer slurry. The weight ratio of polymer to oxygen can vary widely but generally ranges from about 5:1 to about 1,000:1.

The polymer/water slurry can consist of about 5 to about 60 wt. % polymer and more preferably from about 10 to about 30 wt. % polymer to provide convenient handling and separation factors.

After the purification and drying steps, the resin is left in the form of a finely divided, free flowing, white powder having a particle size range averaging from about 5 to about 1,500 micromillimeters. In the processes of this invention it is preferred to utilize such finely divided resin to expedite contact with the water and treating agents.

The process of this invention can be conducted batchwise or continuously.

The heating, according to the invention, can be carried out in conventional equipment. A convenient method for carrying out the process is to contact the polymer slurry with the oxygen-containing gaseous medium in an enclosed tank provided with agitation. The contacting can be carried out in a single vessel or with a plurality of vessels. The polymer can be separated from the slurry after contacting by suitable techniques including pressure reduction to atmospheric, filtration, and the like, and allowing the polymer to be subsequently dried for further use as desired.

The following examples are intended to illustrate the compositions and process of the invention.

EXAMPLE I

A series of runs was made in which, in each instance, a 2 gallon (7.6 liter), stirred, stainless steel reactor was charged in order with 300 g of particulate poly(phenylene sulfide), hereafter abbreviated PPS, having 0.82 wt. % ash and nominal melt flow in the range of about 3,000–12,000 g/10 minutes (the exact value was not determined precisely) and 2420 mL of previously boiled deionized water. After closing the reactor and with the stirrer operating at the normal 1,000 RPM, it was pressured with nitrogen at about 115 psia (0.793 MPa) to confirm that it was properly sealed. The sealed reactor and its contents were heated to 460° F. (238° C.) to give a reactor pressure of 465 psia (3.21 MPa). At that time sufficient compressed air (265 psia) was charged to the reactor to increase the reactor pressure to 715 psia (4.93 MPa). A small exotherm of about 3°–4° C. was noted after admitting the air but the temperature returned to the desired 460° F. after about 15 minutes or less. The run was then conducted for the specified hours at 460° F. in the stirred reactor. The reactor and contents were then quickly cooled to about room temperature (25° C.) by means of a water cooled internal coil, the gases were vented, the reactor contents were filtered, washed three times with portions of acetone, and dried overnight (about 16 hours) at 200° F. (93° C.) in a vacuum oven. The dry, recovered polymer was then weighed to determine the yield, the ash content, and the melt flow. The calculated polymer to oxygen weight ratio in each run was about 20:1.

The run times employed and the results obtained are given in Table 1.

TABLE 1

| | | Air-Water Treating PPS at 238° C. | | | | |
|---|---|---|---|---|---|---|
| | | Total | | | Polymer | |
| Run No. | Run Time (hours) | Reaction Pressure | | Ash (wt. %) | Melt Flow (g/10 min.) | Recovered (%) |
| | | (psia) | (MPa) | | | |
| 1 | 0 | na(a) | na | 0.82 | 3,000–12,000 | na |
| 2 | .2 | 715 | 4.93 | 0.31 | 104 | 94 |
| 3 | 2.25 | 720 | 4.96 | 0.28 | 58 | 95 |
| 4 | 2.5 | 715 | 4.93 | 0.29 | 50 | 92 |
| 5 | 3.5 | 715 | 4.93 | 0.40 | <3 | 93 |

Note:
(a)na is not applicable

Inspection of the results presented in Table 1 reveals that PPS is substantially reduced in melt flow and in ash content by treatment in air and water at 460° F. and about 715 psia. The ash content of the polymer is reduced to about 34 to 49% of its original content more or less independently of the contacting time whereas the melt flow is directly dependent on the length of contacting time. Thus, the high melt flow of the starting particulate polymer is reduced to less than about 3 after 3.5 hours treating.

EXAMPLE II

Another series of runs was conducted as described in Example I except that 600 g portions of the same base polymer was employed with 2420 mL of the boiled deionized water and that 415 psia (2.86 MPa) of compressed air was charged to the reactor to give a total reactor pressure of 865 psia (5.96 MPa). The calculated polymer to oxygen weight ratio in runs 6–13 was about 26:1.

The run times employed and results obtained are given in Table 2.

TABLE 2

| | | Air-Water Treating PPS at 238° C. and about 5.96 MPa | | | | |
|---|---|---|---|---|---|---|
| | | | | | Polymer | |
| Run No. | Run Time (hours) | Reactor Pressure | | Ash (wt. %) | Melt Flow (g/10 min.) | Recovered (%) |
| | | (psia) | (MPa) | | | |
| 1 | 0 | na(a) | na | 0.82 | 3,000–12,000 | na |
| 6 | 0.5 | 865 | 5.96 | 0.26 | 573 | 95 |
| 7 | 1.0 | 865 | 5.96 | 0.25 | 371 | 96 |
| 8 | 1.5 | 865 | 5.96 | 0.29 | 212 | 95 |
| 9 | 2.0 | 865 | 5.96 | 0.26 | 189 | 96 |
| 10 | 2.5 | 865 | 5.96 | 0.33 | 104 | 96 |
| 11 | 3.0 | 865 | 5.96 | 0.32 | 80 | 96 |
| 12 | 5.0 | 865 | 5.96 | 0.33 | 45 | 96 |
| 13 | 5.0(b) | 875 | 6.03 | 0.30 | 1 | 97 |

Notes:
(a)na is not applicable
(b)After 3 hours the 875 psia pressure was vented to 475 psia (3.28 MPa) and repressured with compressed air to the original level of 875 psia.

The results given in Table 2 show in invention runs 6–9 that the ash content is reduced to about 30–35% of the initial level after treating times ranging from 0.5 to 2 hours. Invention runs 9-13 indicate that with treating times in excess of 2 hours, that is from 2.5 to 5 hours, ash removal has decreased to about 37-40%. The small differences may be the result of experimental error. In any event, substantial reduction in ash content is realized.

All invention runs show that as the treating time lengthens, polymer melt flow rapidly decreases from the original 3,000-12,000 value to 45 under identical treating conditions.

Run 13 is conducted under slightly higher pressure than runs 6-12 and, moreover, another variable is introduced in that the initial charge of air is vented and the reactor repressured with a second charge of air. The effect is to obtain a recovered polymer in run 13 exhibiting a melt flow of 1 compared to the 45 obtained in run 12.

EXAMPLE III

A series of runs was conducted in the 2 gallon reactor employing 200 g portions of the same base polymer as before with 2500 mL of the boiled deionized water and pure oxygen was charged to the heated reactor contents. The calculated polymer to oxygen weight ratio in run 14 was about 17:1, in run 15 was about 12:1, and in run 16 was about 17:1.

The oxygen charge pressures, temperatures employed, and results obtained are presented in Table 3.

TABLE 3

| | Pure Oxygen-Water Treating PPS, 4 Hours | | | | | | | |
|---|---|---|---|---|---|---|---|---|
| | Pressures | | | | Reactor | Polymer | | |
| Run No. | Oxygen | | Total Reactor | | Temp. °C. | Ash (wt. %) | Melt Flow (g/10 min.) | Recovered (%) |
| | (psia) | (MPa) | (psia) | (MPa) | | | | |
| 1 | na[a] | na | na | na | na | 0.82 | 3,000-12,000 | na |
| 14 | 50 | 0.34 | 190 | 1.31 | 177 | 0.49 | 2930 | 95 |
| 15 | 55 | 0.38 | 305 | 2.10 | 204 | 0.28 | 1310 | 94 |
| 16 | 45 | 0.31 | 450 | 3.10 | 232 | 0.27 | 282 | 88 |

Note:
[a] na is not applicable

In invention runs 14-16 it was observed that after charging the oxygen, an exotherm of about 3°-4° C. occurred which disappeared after about 15 minutes into the run.

As in the first two examples, the results in Table 3 indicate that treating a water slurry of PPS with pure oxygen at elevated temperatures and pressures effectively decreases both ash content and melt flow of the PPS.

We claim:

1. A process for the concurrent reduction of ash-forming impurities contained in prepurified arylene sulfide polymers and production of at least partially cured polymer which comprises contacting an aqueous slurry consisting essentially of particulate purified raw arylene sulfide polymer substantially freed of organic amide, unreacted reactants, alkali metal halide, containing residual ash-forming impurities or materials and water with an oxygen-containing gas at an elevated temperature not exceeding about 25° F. below the melting point of the polymer for a period of time sufficient to reduce the ash content and, at the same time, at least partially cure and reduce the melt flow of the polymer.

2. A process according to claim 1 wherein said contacting is effected at a temperature above at least about 300° F. and said oxygen-containing gas is air.

3. A process according to claim 2 wherein said arylene sulfide polymer is polyphenylene sulfide and said contacting is effected at a temperature in the range of about 300° F. to about 520° F.

4. A process according to claim 1 comprising the steps of
   (a) producing a slurry of raw arylene sulfide polymer containing ash-forming impurities in water at a temperature above about 300° F., but not exceeding about 25° F. below the melting point of the polymer,
   (b) contacting the slurry of (a) under oxidizing conditions with an oxygen-containing gas for a period of time sufficient to at least partially cure and reduce the melt flow of the polymer and, at the same time, reduce the ash-forming impurities in the polymer, and
   (c) separating from said slurry at least partially cured polymer substantially freed of ash-forming impurities.

5. A process according to claim 4 wherein said contacting temperature is in the range of about 300° F. to about 520° F. and said oxygen-containing gas is air.

6. A process according to claim 4 wherein said arylene sulfide polymer is poly(phenylene sulfide).

* * * * *